United States Patent [19]
Baues et al.

[11] 4,006,963
[45] Feb. 8, 1977

[54] CONTROLLABLE, ELECTRO-OPTICAL GRATING COUPLER

[75] Inventors: Peter Baues, Krailling; Hans Mahlein, Munich; Achim Reichelt, Munich; Gerhard Winzer, Munich, all of Germany

[73] Assignee: Siemens Aktiengesellschaft, Berlin & Munich, Germany

[22] Filed: July 21, 1975

[21] Appl. No.: 597,663

[30] Foreign Application Priority Data

Sept. 6, 1974 Germany .................... 2442723

[52] U.S. Cl. .................. 350/96 C; 350/96 WG; 350/162 R
[51] Int. Cl.² .................. G02B 5/14; G02B 5/18
[58] Field of Search ........ 350/96 C, 96 WG, 162 R

[56] References Cited
UNITED STATES PATENTS

| | | | |
|---|---|---|---|
| 3,795,433 | 3/1974 | Channin | 350/96 C |
| 3,813,142 | 5/1974 | Buhrer | 350/162 R |
| 3,904,270 | 9/1975 | Cheo | 350/96 C |
| 3,912,363 | 10/1975 | Hammer | 350/96 C |

Primary Examiner—John K. Corbin
Assistant Examiner—Stewart Levy
Attorney, Agent, or Firm—Hill, Gross, Simpson, Van Santen, Steadman, Chiara & Simpson

[57] ABSTRACT

A controllable, electro-optical grating coupler for the optional switch-over or modulation of optical waves in waveguides includes a substrate with a first areal electrode arranged on the substrate and a first dielectric layer arranged on the electrode and carrying a waveguide. A periodic grating structure is arranged in the waveguide transversely to the direction of propagation of light and either the grating structure of the waveguide consist of electro-optical material in the region of the grating structure. A second dielectric layer is arranged on the waveguide and a second areal electrode is arranged on the dielectric layer. By varying the voltage across the electrodes it is possible to amplify or reduce the interference provided by the grating structure so that the light in the waveguide is modulated, switched, scattered from the waveguide or input coupled to a second waveguide.

8 Claims, 2 Drawing Figures

CONTROLLABLE, ELECTRO-OPTICAL GRATING COUPLER

BACKGROUND OF THE INVENTION

1. Field of the Invention

The present invention relates to a controllable, electro-optical grating coupler for optional switch-over or modulation of optical waves in waveguides.

2. Description of the Prior Art

In the optical communications technique using guided waves, in particular, branched optical waveguides require couplers which optionally switch-over or modulate the electromagnetic energy applied thereto. These couplers are generally provided for a single mode of operation.

SUMMARY OF THE INVENTION

The object of the present invention is to provide a controllable, electro-optical grating coupler through which light can be selectively input coupled from a first waveguide into a second wave-guide.

In order to realize the above object, a grating coupler is proposed which consists of a substrate, a first areal electrode arranged on the substrate, and a first dielectric layer arranged on the electrode and carrying a waveguide. A grating structure is arranged periodically in the waveguide transversely to the direction of propogation of light. Either the grating structure consist of electro-optical material or the waveguide consist of electro-optical material in the region of the grating structure. A second dielectric layer is arranged on the waveguide. and a second areal electrode is arranged on the second dielectric layer.

The substrate advantageously consists of glass, a crystal or a semiconductor material.

The grating structure can be a sinusoidal or saw shaped relief which penetrates into the waveguide.

The relief is advantageously filled with dielectric material up to the surface of the waveguide.

BRIEF DESCRIPTION OF THE DRAWING

Other objects, features and advantages of the invention, its organization, construction and operation will be best understood from the following detailed description taken in conjunction with the accompanying drawing, on which.

DESCRIPTION OF THE PREFERRED EMBODIMENT

Figure 1:
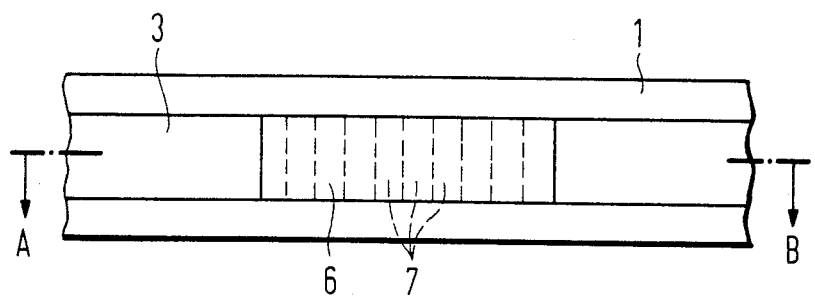
FIG. 1 is a plan view of a grating coupler constructed in accordance with the invention.
Figure 2:
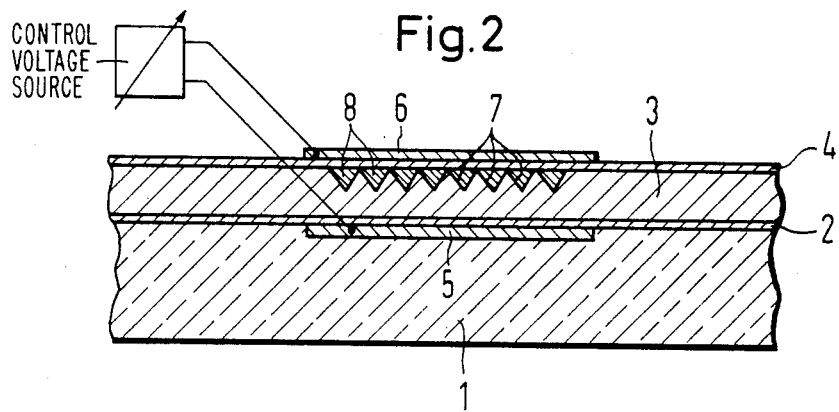
FIG. 2 is a sectional view of the grating coupler of FIG. 1 taken generally along the parting line A—B of FIG. 1.

In the grating coupler illustrated schematically in FIGS. 1 and 2, a substrate 1 is provided which consists of glass, a crystal, or a semiconductor material on which is arranged an areal electrode 5.

Over the areal electrode 5 is an areal dielectric layer 2 which carries a waveguide 3. Periodic disturbances are provided transversely of the direction of propagation of light in the waveguide 3 in the material thereof in the form of a sinusoidal or saw tooth shaped relief 7 which represents a grating structure.

The relief 7 can, for example, be produced by chemical etching, sputtering, mechanical engraving or vapor deposition.

The relief 7 is itself filled with dielectric material 8 up to the full thickness of the waveguide 3. At least one of the two layers, i.e. the relief layer or relief filling, must possess electro-optical properties. A second dielectric layer 4 is arranged above the relief filling 8 and carries a thickened areal electrode 6.

In dependence upon the substances selected for the relief carrier and the relief filling, the grating structure can serve as an optical interference for the guidance of waves with or without voltage applied across the electrodes 5 and 6. By varying the voltage across these electrodes, it is possible to amplify or reduce the interference. In this manner, the guided wave is modulated, switched, scattered from the waveguide 3 or input coupled into a second wave guide.

In the latter case, the grating coupler, in accordance with the invention, is extended by a second waveguide (not illustrated) which is located between the first waveguide 3 and one of the two dielectric layers. In this case, it is expedient to separate the two waveguides by a further thin, dielectric layer (also not illustrated).

The electrodes 5 and 6 can be transparent so that, in the case of modulation of the light, the light can be scattered out of the waveguide 3 by as short a path as possible.

Although we have described our invention by reference to particular embodiments thereof, many changes and modifications of the invention may become apparent to those skilled in the art without departing from the spirit and scope thereof. We therefore intend to include within the patent warranted hereon all such changes and modifications as may reasonably and properly be included within the scope of our contribution to the art.

We claim:

1. A controllable, electro-optical grating coupler for optional switch-over or modulation of optical waves in waveguides, comprising:
 a substrate;
 a first areal electrode carried on said substrate;
 a first dielectric layer carried on said first areal electrode;
 a waveguide carried on said first dielectric layer for the propagation of light in a predetermined direction, including a periodic grating structure transversely of the direction of propagation, said waveguide including electro-optical material in the region of the grid structure;
 a second dielectric layer carried on said waveguide; and
 a second areal electrode arranged on said second dielectric layer.

2. A controllable, electro-optical grating coupler according to claim 1, wherein said substrate consists of glass.

3. A controllable, electro-optical grating coupler according to claim 1, wherein said substrate consists of a crystal.

4. A controllable, electro-optical grating coupler according to claim 1, wherein said substrate consists of a semiconductor.

5. A controllable, electro-optical grating coupler according to claim 1, wherein said grating structure comprises a sinusoidal-shaped relief extending into a surface of said waveguide.

6. A controllable, electro-optical grating coupler according to claim 1, wherein said grating structure is a saw tooth shaped relief which extends into a surface of said waveguide.

7. A controllable, electro-optical grating coupler according to claim 1, wherein said grating structure is a sinusoidal-shaped relief extending into a surface of said waveguide, and comprising dielectric material filling said relief up to said surface of said waveguide.

8. A controllable, electro-optical grating coupler according to claim 1, wherein said grating structure is a saw tooth-shaped relief which extends into a surface of said waveguide and comprising dielectric material filling said relief up to said surface of said wave-guide.

* * * * *